US012700680B2

(12) United States Patent
Sato

(10) Patent No.: US 12,700,680 B2
(45) Date of Patent: Aug. 4, 2026

(54) ANTENNA MODULE AND COMMUNICATION APPARATUS INCLUDING THE SAME

(71) Applicant: Murata Manufacturing Co., Ltd., Nagaokakyo (JP)

(72) Inventor: Yosuke Sato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 193 days.

(21) Appl. No.: 18/796,323

(22) Filed: Aug. 7, 2024

(65) Prior Publication Data

US 2024/0396232 A1 Nov. 28, 2024

Related U.S. Application Data

(63) Continuation of application No. PCT/JP2022/046654, filed on Dec. 19, 2022.

(30) Foreign Application Priority Data

Feb. 16, 2022 (JP) ................................ 2022-022340

(51) Int. Cl.
*H01Q 21/06* (2006.01)
*H01Q 1/22* (2006.01)
(Continued)

(52) U.S. Cl.
CPC ......... *H01Q 21/065* (2013.01); *H01Q 1/2283* (2013.01); *H01Q 1/523* (2013.01); *H01Q 9/0407* (2013.01); *H01Q 21/24* (2013.01)

(58) Field of Classification Search
CPC ................ H01Q 1/2283; H01Q 1/523; H01Q 9/0407–0492; H01Q 21/065; H01Q 21/24; H01Q 1/521
See application file for complete search history.

(56) References Cited

U.S. PATENT DOCUMENTS 11,335,991 B2 * 5/2022 Kim .................... H01Q 1/2283
12,003,012 B2 * 6/2024 Gouchi ............... H01Q 9/0407
(Continued)

FOREIGN PATENT DOCUMENTS

JP 2018-148290 A 9/2018
WO 2019/026595 A1 2/2019
(Continued)

OTHER PUBLICATIONS

International Search Report and Written Opinion mailed on Feb. 14, 2023, received for PCT Application PCT/JP2022/046654, filed on Dec. 19, 2022, 11 pages including English Translation.

*Primary Examiner* — Ab Salam Alkassim, Jr.
(74) *Attorney, Agent, or Firm* — XSENSUS LLP

(57) ABSTRACT

An antenna module that includes dielectric substrates, radiating elements that are of a plate shape and disposed in or on the dielectric substrates, ground electrodes, and a peripheral electrode. The ground electrode is disposed in or on the dielectric substrate to face the radiating element. The ground electrode is disposed in or on the dielectric substrate to face the radiating element and is electrically connected to the ground electrode. The peripheral electrode is disposed in a layer, in the dielectric substrate, between the ground electrode and the radiating element and is electrically connected to the ground electrode. A direction normal to the radiating element is a first direction from the ground electrode toward the radiating element. A direction normal to the radiating element is a second direction different from the first direction. The peripheral electrode extends from the ground electrode in the first direction.

20 Claims, 9 Drawing Sheets

(51) Int. Cl.
*H01Q 1/52* (2006.01)
*H01Q 9/04* (2006.01)
*H01Q 21/24* (2006.01)

(56) References Cited

U.S. PATENT DOCUMENTS

| | | | | |
|---|---|---|---|---|
| 12,003,015 | B2 * | 6/2024 | Yamakawa | H01Q 21/0025 |
| 12,027,787 | B2 * | 7/2024 | Gouchi | H01Q 21/065 |
| 12,218,432 | B2 * | 2/2025 | Sugahara | H01Q 21/08 |
| 2017/0069958 | A1 | 3/2017 | Ko et al. | |
| 2018/0254555 | A1 * | 9/2018 | Sotoma | H01Q 21/28 |
| 2019/0207323 | A1 * | 7/2019 | Joung | H01Q 1/523 |
| 2019/0229413 | A1 * | 7/2019 | Jong | H01Q 1/523 |
| 2019/0379134 | A1 * | 12/2019 | Paulotto | H01Q 21/062 |
| 2020/0112081 | A1 * | 4/2020 | Kim | H01Q 1/2283 |
| 2020/0161749 | A1 * | 5/2020 | Onaka | H01Q 21/24 |
| 2020/0194893 | A1 * | 6/2020 | Im | H01Q 9/045 |
| 2020/0312798 | A1 * | 10/2020 | Kawahata | H01Q 9/0414 |
| 2020/0373655 | A1 * | 11/2020 | Takayama | H01Q 1/40 |
| 2020/0395675 | A1 * | 12/2020 | Han | H01Q 9/0414 |
| 2020/0395681 | A1 * | 12/2020 | Ueda | H01Q 1/2283 |
| 2021/0098882 | A1 * | 4/2021 | Paulotto | H01Q 1/243 |
| 2021/0143531 | A1 * | 5/2021 | Sudo | H01Q 23/00 |
| 2021/0151874 | A1 * | 5/2021 | Sudo | H01Q 21/065 |
| 2021/0336342 | A1 * | 10/2021 | Gouchi | H01Q 5/378 |
| 2022/0216605 | A1 * | 7/2022 | Yamada | H01Q 19/185 |
| 2022/0368031 | A1 * | 11/2022 | Gouchi | H01Q 1/2283 |
| 2023/0059346 | A1 * | 2/2023 | Lim | H01Q 21/28 |
| 2023/0352824 | A1 * | 11/2023 | Yamakawa | H01Q 1/38 |
| 2024/0313426 | A1 * | 9/2024 | Yamada | H01Q 1/38 |
| 2024/0332810 | A1 * | 10/2024 | Suzuki | H01Q 9/0407 |
| 2025/0007182 | A1 * | 1/2025 | Minamitani | H01Q 9/0414 |
| 2025/0260157 | A1 * | 8/2025 | Dokai | H01Q 21/08 |
| 2026/0088504 | A1 * | 3/2026 | Dokai | H01Q 5/307 |

FOREIGN PATENT DOCUMENTS

| | | | |
|---|---|---|---|
| WO | 2021/059661 | A1 | 4/2021 |
| WO | 2021/153034 | A1 | 8/2021 |

* cited by examiner

ANTENNA MODULE AND COMMUNICATION APPARATUS INCLUDING THE SAME

CROSS-REFERENCE TO RELATED APPLICATIONS

This is a continuation application of PCT/JP2022/046654, filed on Dec. 19, 2022, designating the United States of America, which is based on and claims priority to Japanese Patent Application No. JP 2022-022340 filed on Feb. 16, 2022. The entire contents of the above-identified applications, including the specifications, drawings and claims, are incorporated herein by reference in their entirety.

TECHNICAL FIELD

The present disclosure relates to an antenna module and a communication apparatus including the same and more specifically relates to technology for improving antenna characteristics.

BACKGROUND ART

U.S. Patent Application Publication No. 2017/0069958 (Patent Document 1) discloses a configuration in which a planar antenna is disposed on a side surface of a substrate, a metal wall (dummy electrode) connected to a ground electrode is provided on the side surface, and the dummy electrode is used as a ground electrode for the antenna on the side surface.

CITATION LIST

Patent Document

Patent Document 1: U.S. Patent Application Publication No. 2017/0069958

SUMMARY OF DISCLOSURE

Technical Problem

It is desired that communication apparatuses represented by a mobile terminal such as a mobile phone or a smartphone be further downsized and thinned. Along with this, downsizing and height reduction are also required for an antenna module included in each communication apparatus. In addition, the downsizing of the communication apparatus causes an installation place of the antenna module in the apparatus to be limited in some cases, and such cases lead to a possible state where the area for a ground electrode in the antenna module is not sufficiently ensured.

Typically, from the viewpoint of antenna characteristics such as frequency bandwidth widening and loss reduction, a plate-shaped patch antenna preferably has a ground electrode having a sufficiently large area for radiating elements. However, in the case where the ground electrode size is limited for downsizing as described above, there is a possibility that desired antenna characteristics are not achieved.

In particular, in a case where radio waves are radiated in two different directions in a thin communication apparatus, the installation place for the antenna module is extremely limited, and thus there is a concern of antenna characteristic deterioration.

The present disclosure has been made to address the issue as described above, and it is an object to prevent antenna characteristic deterioration and also achieve downsizing in an antenna module capable of radiating radio waves in two different directions.

Solution to Problem

An antenna module according to the present disclosure includes a dielectric substrate, a first radiating element and a second radiating element that are of a plate shape and that are disposed in or on a dielectric substrate, a first ground electrode, a second ground electrode, and a first peripheral electrode. The first ground electrode are disposed in or on the dielectric substrate to face the first radiating element. The second ground electrode is disposed in or on the dielectric substrate to face the second radiating element and is electrically connected to the first ground electrode. The first peripheral electrode is disposed in a layer, in the dielectric substrate, between the first ground electrode and the first radiating element and is electrically connected to the first ground electrode. A direction normal to the first radiating element is a first direction from the first ground electrode toward the first radiating element. A direction normal to the second radiating element is a second direction different from the first direction. The first peripheral electrode extends from the first ground electrode in the first direction. In plan view in the second direction, the second radiating element is disposed in a region formed by the first peripheral electrode and the second ground electrode. A distance between the second radiating element and the first peripheral electrode in the second direction is longer than a distance between the first radiating element and the first peripheral electrode in the second direction.

Advantageous Effects of Disclosure

In the antenna module according to the present disclosure, the peripheral electrode connected to the first ground electrode of the first radiating element and erecting from the first ground electrode toward the first radiating element is disposed. With the configuration as described above, even assuming the size of the first ground electrode is limited, the peripheral electrode causes a line of electric force going round from the first radiating element to the first ground electrode to be reduced, and thus antenna characteristic deterioration may be prevented. In addition, the peripheral electrode is also used as part of the ground electrode of the second radiating element, and the distance between the peripheral electrode and the second radiating element is made longer than the distance between the peripheral electrode and the first radiating element. This enables the bandwidth of the second radiating element to be ensured and also downsizing to be achieved. Accordingly, in the antenna module capable of radiating radio waves in two different directions, the antenna characteristic deterioration may be prevented, and downsizing may be achieved.

DESCRIPTION OF EMBODIMENTS

Figure 1:
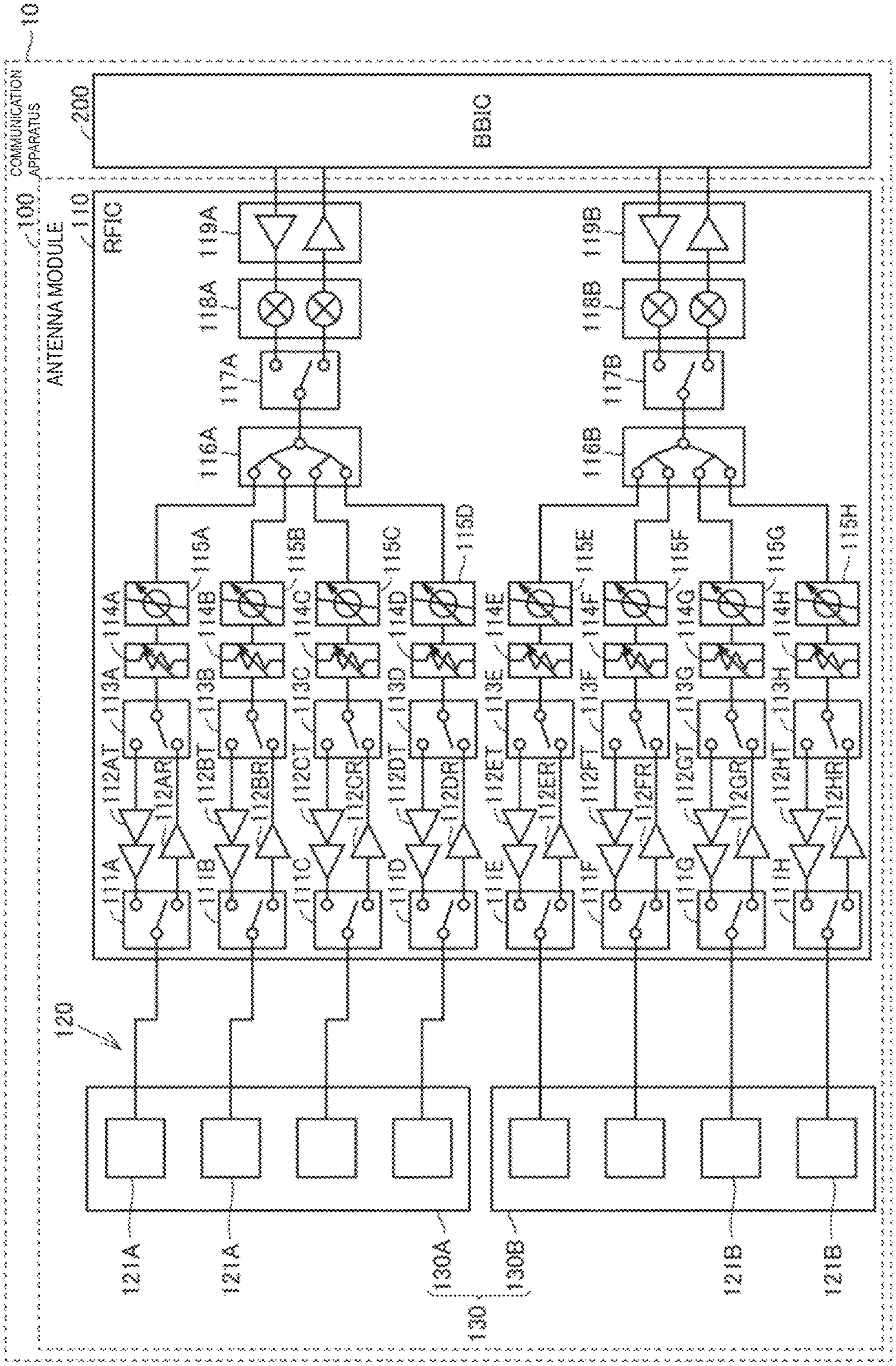
FIG. 1 is a block diagram of a communication apparatus to which an antenna module according to Embodiment 1 is applied.

Hereinafter, embodiments of the present disclosure will be described in detail with reference to the drawings. The same or corresponding portions are denoted by the same reference numerals, and description thereof is not repeated.

Embodiment 1

(Basic Configuration of Communication Apparatus)

FIG. 1 is a block diagram of a communication apparatus 10 to which an antenna module 100 according to this embodiment is applied. The communication apparatus 10 is, for example, a mobile terminal such as a mobile phone, a smartphone, or a tablet, or a personal computer having a communication function. A frequency band of a radio wave used for the antenna module 100 according to this embodiment is, for example, a frequency band of a radio wave in a millimeter wave band with a center frequency of 28 GHz, 39 GHz, 60 GHz, or the like but is applicable to a radio wave in a frequency band other than the above.

With reference to FIG. 1, the communication apparatus 10 includes the antenna module 100 and a BBIC 200 configured as a baseband signal processing circuit. The antenna module 100 includes a RFIC 110 as an example of a feeder circuit and an antenna device 120. The communication apparatus 10 radiates, from the antenna device 120, a radio frequency signal upconverted from a signal transmitted from the BBIC 200 to the antenna module 100 and also processes, at the BBIC 200, a signal downconverted from a radio frequency signal received by the antenna device 120.

The antenna device 120 includes a dielectric substrate 130 in which radiating elements 121A and 121B are disposed. The dielectric substrate 130 includes two substrates 130A and 130B, and at least one radiating element is disposed in each substrate. More specifically, radiating elements 121A (first radiating elements) the number of which is $m_1$ are disposed in the substrate 130A, and the radiating element 121B (a second radiating elements) the number of which is $n_1$ are disposed in the substrate 130B ($m_1 \geq 1$, $n_1 \geq 1$). The number $m_1$ of the radiating elements 121A disposed in the substrate 130A may be the same as or different from the number $n_1$ of the radiating elements 121B disposed in the substrate 130B.

FIG. 1 illustrates, as an example, a configuration in which the four radiating elements 121A are disposed in the substrate 130A and the four radiating elements 121B are disposed in the substrate 130B ($m_1=4$, $n_1=4$), the number of radiating elements each disposed in a corresponding one of the substrates is not limited to this. Although FIG. 1 illustrates an example where the radiating elements are disposed in one line in a one-dimensional array form in the corresponding substrate, but the radiating elements may be disposed in a two-dimensional array form in the substrate. Alternatively, a configuration in which a single radiating element is disposed in the substrate may be used.

The radiating elements 121A and 121B are each a plate-shaped patch antenna having a shape of a circle, an ellipse, or a polygon. In this embodiment, a case where the radiating elements 121A and 121B are each a micro strip antenna of substantially a square shape will be described as an example.

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, a signal multiplexer/demultiplexer 116A and a signal multiplexer/demultiplexer 116A and 116B, mixers 118A and 118B, and amplifier circuits 119A and 119B. Of these, the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A are configured as a circuit for a radio frequency signal radiated from the radiating element 121A of the substrate 130A. The switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B are configured as a circuit for a radio frequency signal radiated from the radiating element 121B of the substrate 130B.

In a case where a radio frequency signal is transmitted, the switches 111A to 111H and 113A to 113H are switched over to the power amplifiers 112AT to 112HT, and the switches 117A and 117B are connected to amplifiers on the transmission side in the amplifier circuits 119A and 119B. In a case where the radio frequency signal is received, the switches 111A to 111H and 113A to 113H are switched over to the low-noise amplifiers 112AR to 112HR, and the switches 117A and 117B are connected to amplifiers on the reception side in the amplifier circuits 119A and 119B.

Signals transmitted from the BBIC 200 are amplified by the amplifier circuits 119A and 119B and upconverted by the mixers 118A and 118B. The transmission signals that are upconverted radio frequency signals are demultiplexed into four signals by the signal multiplexer/demultiplexer 116A and the signal multiplexer/demultiplexer 116B and supplied to the respective radiating elements 121A and 121B via respective signal paths. The phase shift degrees of the respective phase shifters 115A to 115H disposed on the signal paths are controlled individually, and the directivity of radio waves output from the respective radiating elements of the substrates may thereby be controlled.

Reception signals that are radio frequency signals received by the respective radiating elements 121A and 121B are transmitted to the RFIC 110 and multiplexed by the signal multiplexer/demultiplexer 116A and the signal multiplexer/demultiplexer 116B via four respective different signal paths. The multiplexed reception signals are downconverted by the mixers 118A and 118B, amplified by the amplifier circuits 119A and 119B, and transmitted to the BBIC 200.

The RFIC 110 is formed, for example, as an integrated circuit component as one chip having the above-described circuit configuration. Alternatively, devices (a switch, a power amplifier, a low-noise amplifier, an attenuator, and a phase shifter) for each of the radiating elements 121A and 121B in the RFIC 110 may be formed as an integrated circuit component as one chip for the corresponding radiating element.

(Antenna Module Structure)

Figure 2:
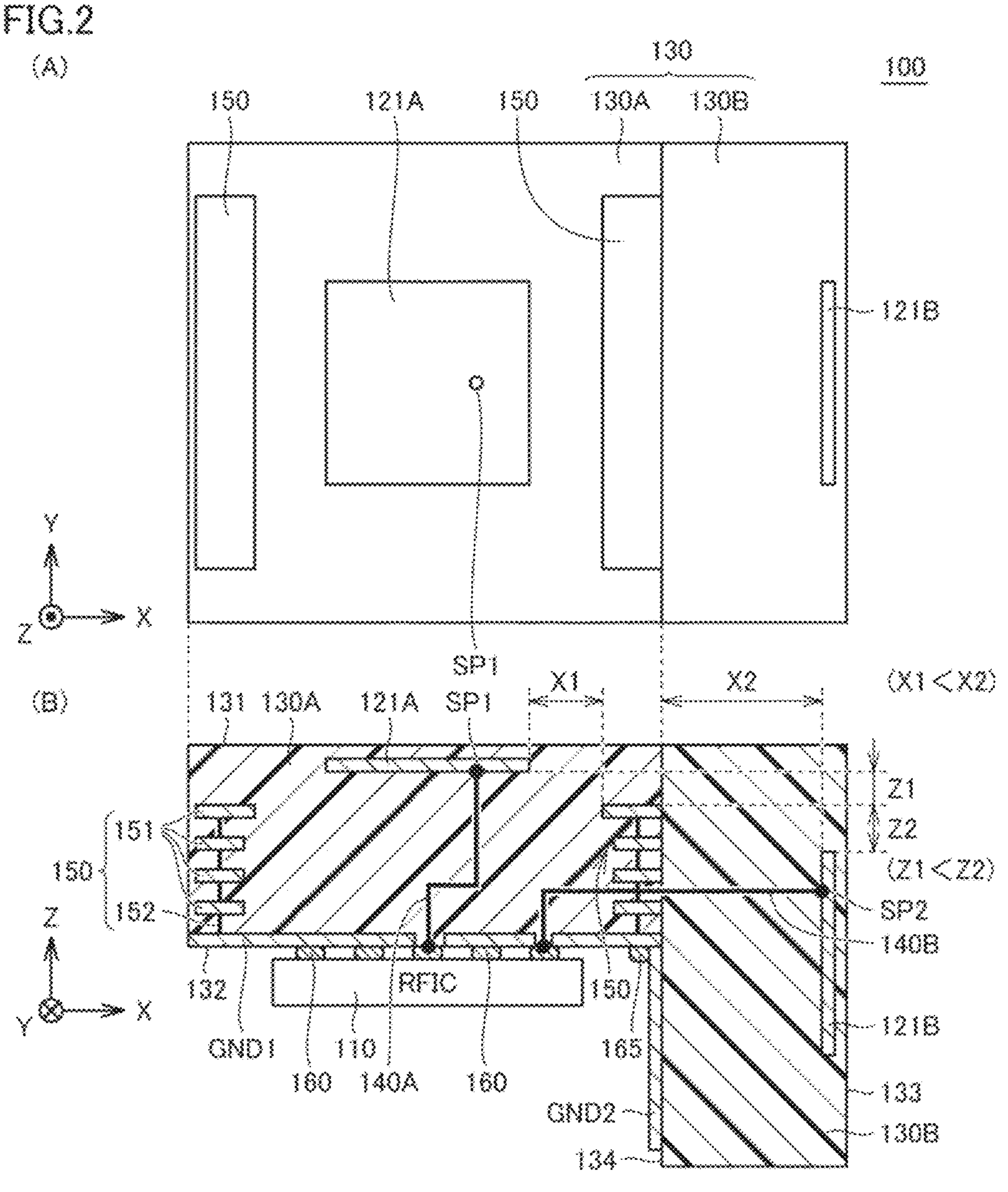
FIG. 2 illustrates a plan view and a side perspective view of the antenna module in FIG. 1.

Details of the configuration of the antenna module 100 in Embodiment 1 will then be described by using FIG. 2. FIG. 2 is a view illustrating the antenna module 100 according to Embodiment 1. FIG. 2 illustrates a plan view of the antenna module 100 (FIG. 2(A)) in an upper part and a side perspective view (FIG. 2(B)) in a lower part.

The antenna module 100 includes feed wiring lines 140A and 140B, peripheral electrodes 150, and ground electrodes GND1 and GND2 in addition to the radiating elements 121A and 121B, the dielectric substrate 130, and the RFIC 110. In the following description, a direction normal to the substrate 130A is defined as a Z-axis direction, a direction normal to the substrate 130B is defined as an X-axis direction, and a direction orthogonal to these is defined as a Y-axis direction. A positive direction and a negative direction of the Z axis in the drawings are respectively referred to as an upper side and a lower side on occasions.

The substrates 130A and 130B included in the dielectric substrate 130 are each, for example, a low-temperature co-fired ceramic (LTCC: Low Temperature Co-fired Ceramics) multi-layer substrate, a multi-layer resin substrate formed by laminating a plurality of resin layers formed from resin such as epoxy or polyimide, a multi-layer resin substrate formed by laminating a plurality of resin layers formed from liquid crystal polymer (Liquid Crystal Polymer: LCP) having a lower dielectric constant, a multi-layer resin substrate formed by laminating a plurality of resin layers formed from fluorine-based resin, a multi-layer resin substrate formed by laminating a plurality of resin layers formed from a Polyethylene terephthalate (PET) material, or a ceramic multi-layer substrate other than the LTCC. The dielectric substrate 130 does not necessarily have to have the multi-layer structure and may be a single-layer substrate. The substrate 130A and the substrate 130B may be formed from the same dielectric or different dielectrics.

In plan view in the normal direction (Z-axis direction), the substrate 130A has a rectangular shape. The radiating element 121A is disposed near an upper surface 131 of the substrate 130A. The radiating element 121A may be disposed in such a manner as to be exposed from the surface of the substrate 130A or may be disposed inside the substrate 130A as in the example in FIG. 2 (B).

The ground electrode GND1 is disposed on a lower surface 132 of the substrate 130A to extend over the entire substrate 130A. The RFIC 110 is also mounted on the lower surface 132 of the substrate 130A with solder bumps 160 interposed therebetween. The RFIC 110 may be connected to the substrate 130A by using multipole connectors, instead of the soldering connection.

A radio frequency signal is supplied from the RFIC 110 to the radiating element 121A via the feed wiring line 140A. The feed wiring line 140A penetrates from the RFIC 110 through the ground electrode GND1 and is then connected to a feed point SP1 of the radiating element 121A. The feed point SP1 is shifted from the center of the radiating element 121A in a positive direction of the X axis. The radio wave a polarization direction of which is the X-axis direction is radiated from the radiating element 121A in the Z-axis direction.

In the antenna module 100, the peripheral electrodes 150 are formed on an end portion, in the X-axis direction (that is, the polarization direction), of the substrate 130A and in a dielectric layer between the radiating element 121A and the ground electrode GND1. In plan view in the direction normal to the substrate 130A, each peripheral electrode 150 is rectangular and extends in the Y-axis direction on an end portion, in the X-axis direction, of the substrate 130A. To ensure the symmetry of the radiated radio wave, the peripheral electrode 150 is disposed in the center portion of a side, in the Y-axis direction, of the radiating element 121A. The dimension along the Y axis of the peripheral electrode 150 is longer than the dimension of the corresponding sides of the radiating element 121A. In other words, the peripheral electrode 150 extends in a direction crossing the polarization direction of the radiating element 121A. Assuming the radiating element 121A is shaped into a circle, an ellipse, or another polygon, not a rectangle, the peripheral electrode 150 is made larger than the maximum outer diameter dimension of the radiating element 121A.

In a stacking direction (Z-axis direction) of the substrate 130A, the peripheral electrode 150 includes a plurality of plate electrodes 151 and at least one via 152 electrically connecting these. The via 152 is connected to the ground electrode GND1. The potential of the peripheral electrode 150 is thus the ground potential.

Assuming the area of the ground electrode GND1 is limited due to the downsizing requirement, part of an electric field between the radiating element 121A and the ground electrode GND1 is generated in such a manner as to go round to the back surface side of the ground electrode GND1. The electric field generation causes the radio wave to be radiated from the radiating elements less easily than in a case where the area of the ground electrode GND1 is sufficiently large and thus may deteriorate antenna characteristics.

However, disposing the peripheral electrode 150 causes a line of electric force to be generated predominantly between the radiating element 121A and the peripheral electrode 150 and thus suppression of generation of the electric field going round to the back surface side of the ground electrode GND1. Accordingly, even assuming the area of the ground electrode GND1 is limited due to the downsizing requirement, the antenna characteristic deterioration may be prevented.

In plan view in the direction normal to (X-axis direction), the substrate 130B has a rectangular shape like the substrate 130A. The radiating element 121B is disposed near a main surface 133, in the positive direction of the X axis, of the substrate 130B. The radiating element 121B may be disposed in such a manner as to be exposed from the surface of the substrate 130B or may be disposed inside the substrate 130B as in the example in FIG. 2 (B).

A main surface 134 of the substrate 130B in a negative direction of the X axis is connected to a side surface of the substrate 130A. The connection of the substrate 130A and the substrate 130B causes a side surface of the dielectric substrate 130 viewed in the Y-axis direction to be substantially L-shaped.

On the main surface 134 of the substrate 130B, the ground electrode GND2 is disposed over an entire portion protruding downward (in the negative direction of the Z axis) with respect to the substrate 130A. On the boundary portion with the substrate 130A, a conductive connecting member 165 causes the ground electrode GND2 to be electrically connected to the ground electrode GND1 of the substrate 130A.

A side surface of the substrate 130A connected to the substrate 130B is in a state where the peripheral electrode 150 is exposed, and the main surface 134 of the substrate 130B is in contact with an end face of the peripheral electrode 150. That is, the peripheral electrode 150 is electrically connected to the ground electrode GND2 with the ground electrode GND1 interposed therebetween. The configuration as described above causes the peripheral electrode 150 to function as part of a ground electrode for the radiating element 121B. The dimension, in the Y axis, of the peripheral electrode 150 is longer than the dimension of the corresponding sides of the radiating element 121B. In other words, in plan view in the direction normal to the substrate 130B, the radiating element 121B is disposed within a region formed by the peripheral electrode 150 and the ground electrode GND2. In FIG. 2, in plan view in the X-axis direction, the radiating element 121B is disposed in such a manner as to overlap with the peripheral electrode 150 and the ground electrode GND2; however, instead of this, the radiating element 121B may also be disposed in such a manner as to overlap with only the ground electrode GND2 or only the peripheral electrode 150.

A radio frequency signal is supplied from the RFIC 110 to the radiating element 121B via the feed wiring line 140B. The feed wiring line 140B penetrates from the RFIC 110 through the ground electrode GND1, the substrate 130A, and the substrate 130B and is then connected to a feed point SP2 of the radiating element 121B. The feed point SP2 is shifted from the center of the radiating element 121B in a positive direction of the Z axis. The radio wave the Z-axis direction of which is the polarization direction is radiated from the radiating element 121B in the X-axis direction.

Assuming a distance between the radiating element 121A and the peripheral electrode 150 in the X-axis direction is X1, and assuming a distance between the radiating element 121B and the peripheral electrode 150 in the X-axis direction is X2, the distance X2 is longer than the distance X1 (X1<X2). The configuration as described above enables downsizing to be achieved by enhancing coupling between the radiating element 121A and the peripheral electrode 150 and also enables the bandwidth of the radio wave radiated from the radiating element 121B to be ensured by ensuring a distance between the radiating element 121B and the ground electrode GND2.

In addition, assuming a distance between the radiating element 121A and the peripheral electrode 150 in the Z-axis direction is Z1, and assuming the distance, in the Z-axis direction, between the radiating element 121B and an end portion of the peripheral electrode 150 on the upper side is Z2, the distance Z2 is longer than the distance Z1 (Z1<Z2). The configuration as described above enables prevention of coupling between the radiating element 121A and the radiating element 121B and thus enables prevention of characteristic deterioration in isolation between the radiating elements.

With the configuration as in Embodiment 1 as described above, in an antenna module capable of radiating radio waves in two different directions, the antenna characteristic deterioration may be prevented, and downsizing may be achieved.

The radiating element 121A and the radiating element 121B in Embodiment 1 respectively correspond to a first radiating element and a second radiating element in the present disclosure. The ground electrode GND1 and the ground electrode GND2 in Embodiment 1 respectively correspond to a first ground electrode and a second ground electrode in the present disclosure. The substrate 130A and the substrate 130B in Embodiment 1 respectively correspond to a first substrate and a second substrate in the present disclosure.

(Modification 1)

Figure 3:
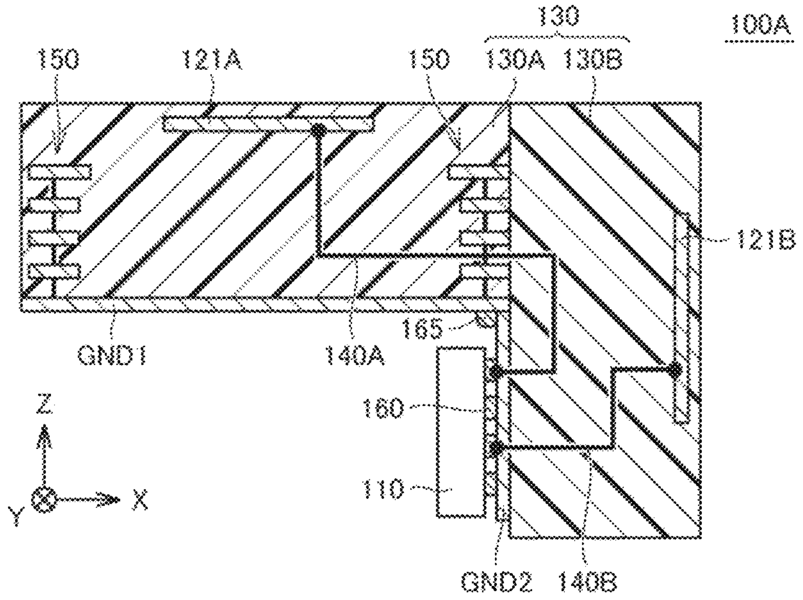
FIG. 3 is a side perspective view of an antenna module in Modification 1.

For the antenna module 100 in Embodiment 1 described above, the configuration in which the RFIC 110 is disposed on the substrate 130A has heretofore been described; however, as in an antenna module 100A in a modification illustrated in FIG. 3, a configuration in which the RFIC 110 is disposed on the substrate 130B may be used.

In this case, the feed wiring line 140A that supplies a radio frequency signal to the radiating element 121A of the substrate 130A penetrates through the ground electrode GND2, the substrate 130B, and the substrate 130A and is then connected to the feed point SP1 of the radiating element 121A. In contrast, a radio frequency signal is supplied to the radiating element 121B via the feed wiring line 140B going through the substrate 130B.

With the antenna module 100A, like the antenna module 100, the antenna characteristic deterioration may be prevented, and downsizing may be achieved.

Embodiment 2

For Embodiment 1, the configuration in which the peripheral electrode 150 is disposed in the substrate 130A and the peripheral electrode 150 is used as part of the ground electrode for the radiating element 121B has heretofore been described.

For Embodiment 2, conversely to Embodiment 1, a configuration in which the ground electrode GND2 disposed in the substrate 130B is used as the peripheral electrode of the radiating element 121A will be described.

Figure 4:
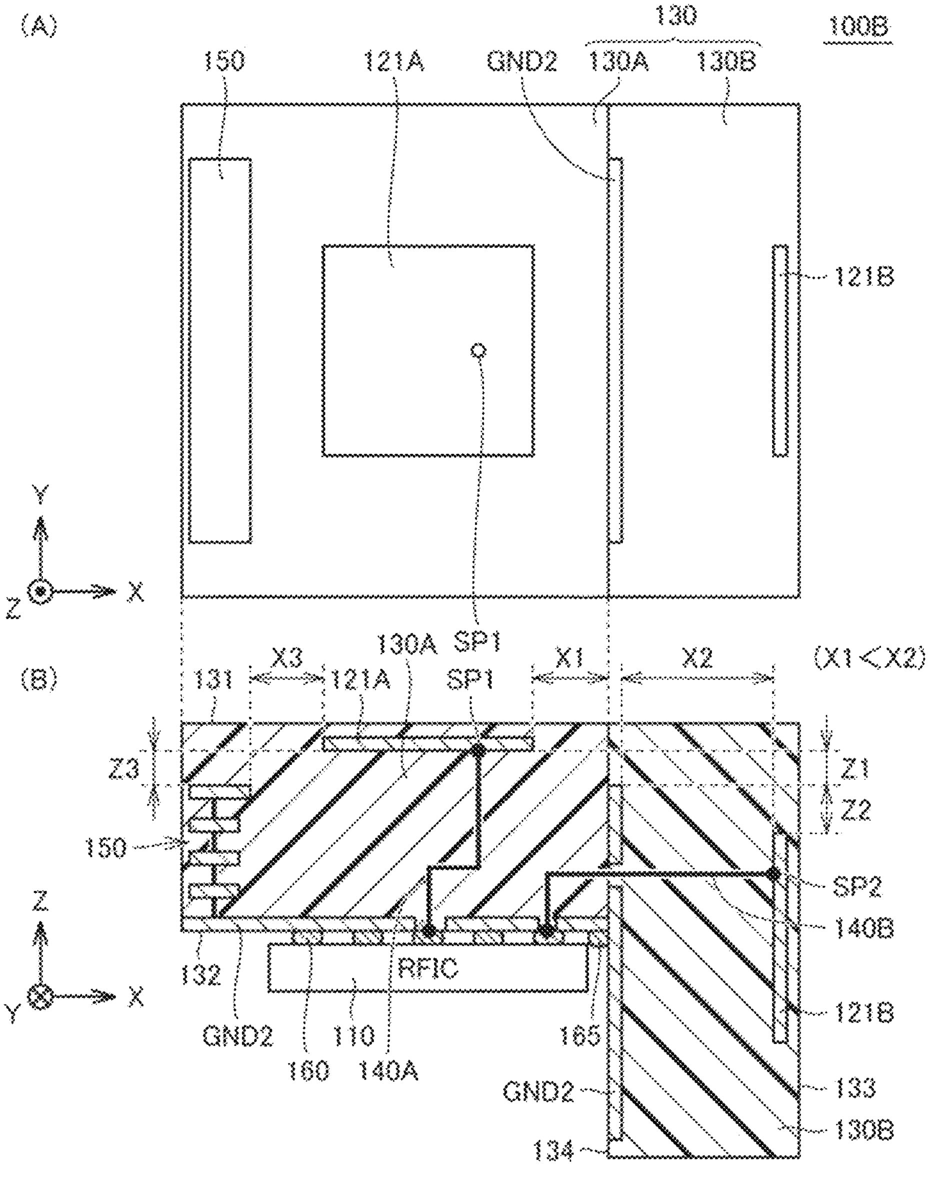
FIG. 4 illustrates a plan view and a side perspective view of an antenna module according to Embodiment 2.

FIG. 4 illustrates a plan view and a side perspective view of an antenna module 100B according to Embodiment 2. The antenna module 100B has a configuration in which the peripheral electrode 150 disposed on the boundary between the substrate 130A and the substrate 130B in the antenna module 100A is removed, and instead of this, the ground electrode GND2 disposed on the main surface 134 of the substrate 130B further extends in the positive direction of the Z axis beyond the lower surface 132 of the substrate 130A on a contact portion between the substrate 130A and the substrate 130B. The feed wiring line 140B penetrates through the ground electrode GND1 and the ground electrode GND2 and is then connected to the feed point SP2 of the radiating element 121B.

That is, a region of the ground electrode GND2 in the positive direction of the Z axis with respect to the lower surface 132 of the substrate 130A corresponds to the peripheral electrode 150 in Embodiment 1. It is assumed that in the antenna module 100B, the ground electrode GND2 and the peripheral electrode 150 are disposed at positions equidistant from the radiating element 121B in the X-axis direction.

Also in the antenna module 100B, like the antenna module 100 in Embodiment 1, the distance X2 between the radiating element 121B and the ground electrode GND2 in the X-axis direction is made longer than the distance X1 between the radiating element 121A and the ground electrode GND2 in the X-axis direction. In addition, the distance Z2, in the Z-axis direction, between the radiating element 121B and an end portion of the ground electrode GND2 on the upper side is made longer than the distance Z1, in the Z-axis direction, between the radiating element 121A and an end portion of the ground electrode GND2 on the upper side.

As described above, causing the ground electrode GND2 of the substrate 130B to function as the peripheral electrode of the radiating element 121A enables the antenna characteristic deterioration to be prevented and downsizing to be achieved. In particular, a dimension in the X-axis direction (thickness) in the ground electrode GND2 is shorter than that of the peripheral electrode 150, and thus the dimension, in the X-axis direction, of the antenna module 100B as a whole may be reduced further.

However, a large difference between the dimension, in the X-axis direction, of the peripheral electrode 150 disposed in the substrate 130A and the dimension, in the X-axis direction, of the ground electrode GND2 may cause imbalance in the degree of coupling with the radiating element 121A. Specifically, coupling between the peripheral electrode 150 and the radiating element 121A is likely to be stronger than coupling between the ground electrode GND2 and the radiating element 121A. This may cause change of the emission direction of the radio wave radiated from the radiating element 121A.

In such a case, the emission direction of the radio wave may be controlled by changing the amount of coupling with the radiating element 121A, for example, in such a manner that a distance X3 between the radiating element 121A and the peripheral electrode 150 in the X-axis direction is made longer than the distance X1 between the radiating element 121A and the ground electrode GND2 and/or a distance Z3 between the radiating element 121A and the peripheral electrode 150 in the Z-axis direction is made longer than the distance Z1, in the Z-axis direction, between the radiating element 121A and an end portion of the ground electrode GND2 on the upper side.

Embodiment 3

For Embodiments 1 and 2, the example in which the dielectric substrate 130 is composed of the two different substrates 130A and 130B has heretofore been described. For Embodiment 3, a configuration in which the two radiating elements 121A and 121B are disposed in one shared dielectric substrate will be described.

Figure 5:
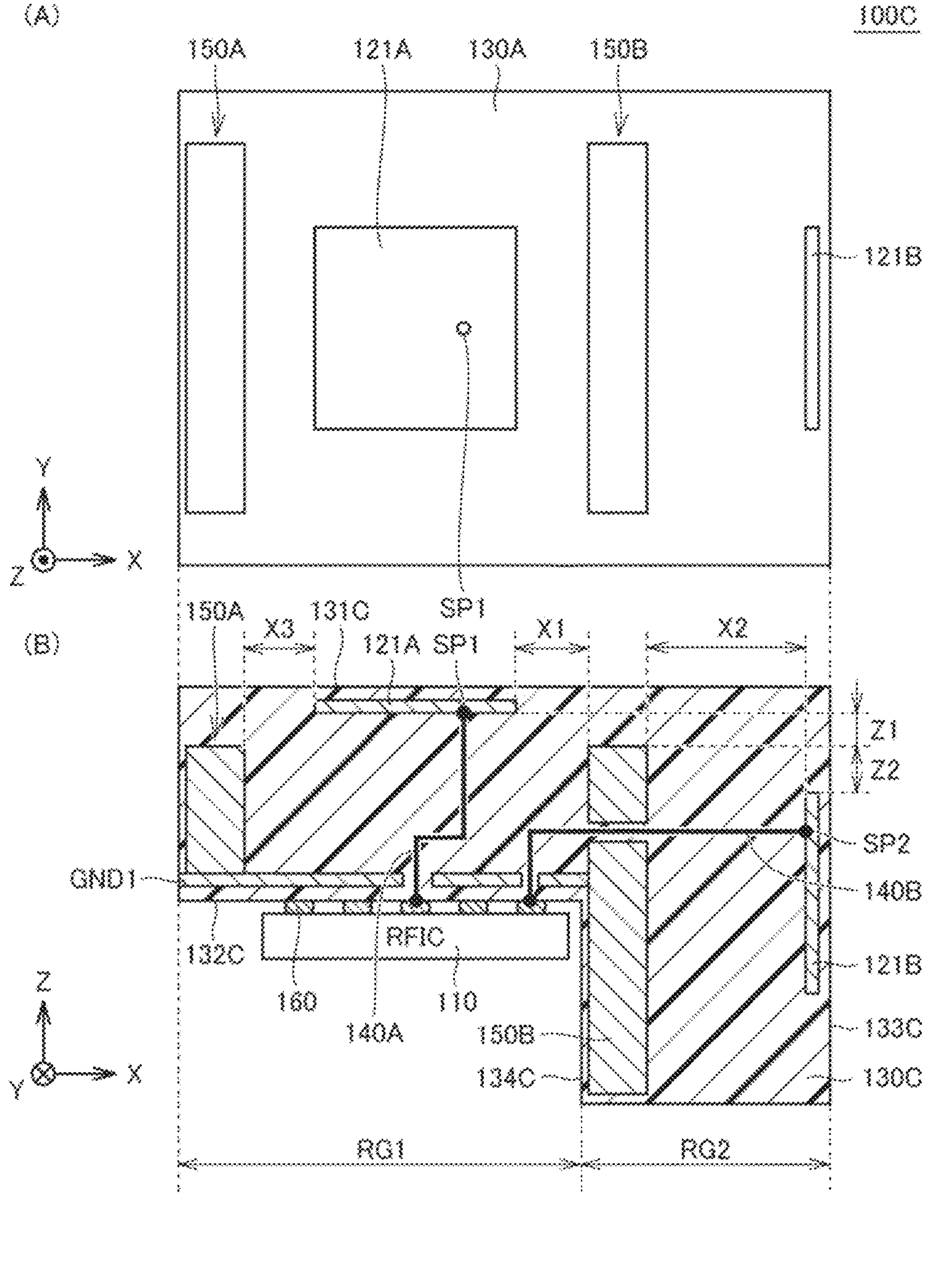
FIG. 5 illustrates a plan view and a side perspective view of an antenna module according to Embodiment 3.

FIG. 5 illustrates a plan view and a side perspective view of an antenna module 100C according to Embodiment 3. With reference to FIG. 5, like Embodiments 1 and 2, the antenna module 100C has a configuration in which the radiating elements 121A and 121B, peripheral electrodes 150A and 150B, the feed wiring lines 140A and 140B, and the ground electrode GND1 are disposed in a dielectric substrate 130C having a side surface viewed in the Y-axis direction is substantially L-shaped. In the following description, a portion for the substrate 130A described above and a portion for the substrate 130B in the dielectric substrate 130C are respectively referred to as a region RG1 and a region RG2.

In the antenna module 100C, the radiating element 121A is disposed in proximity to an upper surface 131C in the region RG1 in the dielectric substrate 130C. In addition, the ground electrode GND1 is disposed in proximity to a lower surface 132C in the region RG1 to face the radiating element 121A.

The RFIC 110 is mounted on the lower surface 132C in the region RG1. A radio frequency signal is supplied from the RFIC 110 to the radiating element 121A via the feed wiring line 140A.

The peripheral electrode 150A is disposed in proximity to a side surface in the negative direction of the X axis in the region RG1. The peripheral electrode 150A is a wall-shaped electric conductor member extending in the Y-axis direction and is electrically connected to the ground electrode GND1.

The radiating element 121B is disposed in proximity to a side surface 133C in the positive direction of the X axis in the region RG2. In addition, the peripheral electrode 150B is disposed in proximity to a side surface 134C in the negative direction of the X axis in the region RG2.

Like the peripheral electrode 150A, the peripheral electrode 150B is a wall-shaped electric conductor member extending in the Y-axis direction and is disposed to face the radiating element 121B. The peripheral electrode 150B extends from a position in proximity to a lower surface 135C in the region RG2 to a position corresponding to an end portion on the upper surface side of the peripheral electrode 150A and is electrically connected to the ground electrode GND1. The peripheral electrode 150B is disposed to face the radiating element 121B and thus also functions as a ground electrode for the radiating element 121B.

The feed wiring line 140B that transmits a radio frequency signal to the radiating element 121B penetrates from the RFIC 110 through the ground electrode GND1 and the peripheral electrode 150B and is then connected to the feed point SP2 of the radiating element 121B.

Also in the antenna module 100C, the distance X2 in the X-axis direction between the radiating element 121B and the peripheral electrode 150B is longer than the distance X1 between the radiating element 121A and the peripheral electrode 150B in the X-axis direction. The distance Z2, in the Z-axis direction, between the radiating element 121B and an end portion of the peripheral electrode 150B on the upper side is longer than the distance Z1 between the radiating element 121A and the peripheral electrode 150B in the Z-axis direction.

Also with the configuration in which components such as the radiating elements 121A and 121B are disposed in the shared dielectric substrate 130C as described above, the antenna characteristic deterioration may be prevented, and downsizing may be achieved. The integrated configuration as described above of the antenna module 100C may be formed, for example, by using a 3D printer.

Embodiment 4

For Embodiments 1 to 3 above, the configuration in which the single radiating element 121A and the single radiating element 121B are disposed has heretofore been described. For Embodiment 4, a configuration of an array antenna in which a plurality of radiating elements 121A and a plurality of radiating elements 121B are disposed in the dielectric substrate will be described.

Figure 6:
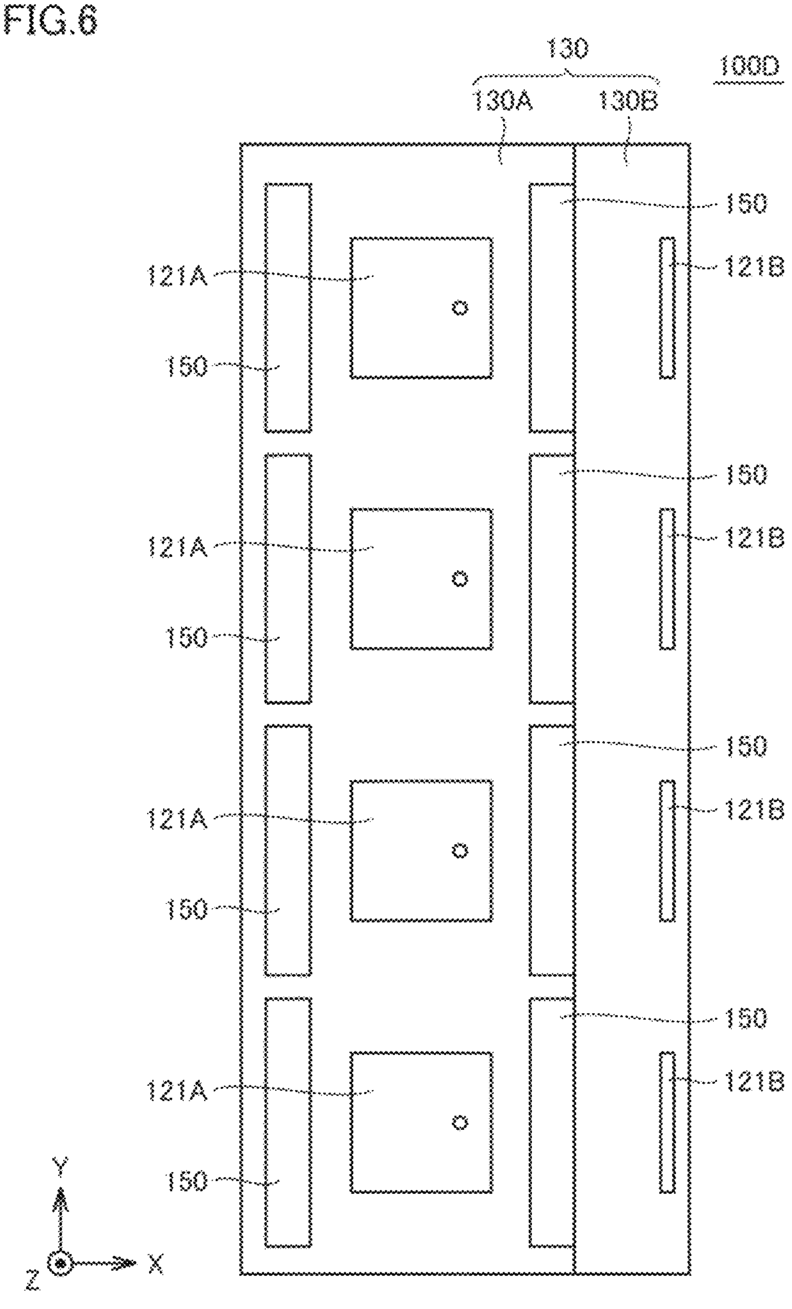
FIG. 6 is a plan view of an antenna module according to Embodiment 4.

FIG. 6 is a plan view of an antenna module 100D according to Embodiment 4. In the antenna module 100D, a plurality of radiating elements are disposed in each of the substrates 130A and 130B included in the dielectric substrate 130. More specifically, the four radiating elements 121A are disposed in the Y-axis direction in the substrate 130A. The four radiating elements 121B are also disposed in the Y-axis direction in the substrate 130B.

The peripheral electrodes 150 are disposed for the respective radiating elements 121A in the substrate 130A in the positive direction and the negative direction of the X axis. A side perspective view of the antenna module 100D viewed in the Y-axis direction is the same as that of the antenna module 100 in FIG. 2 (B).

As described above, also in the array antenna where the plurality of radiating elements are disposed, using the peripheral electrodes and using some peripheral electrodes as part of the ground electrodes for corresponding ones of the paired radiating elements enables the antenna characteristic deterioration to be prevented and downsizing to be achieved. The configuration illustrated in each of Embodiments 2 and 3 may be used for the peripheral electrodes.

Figure 7:
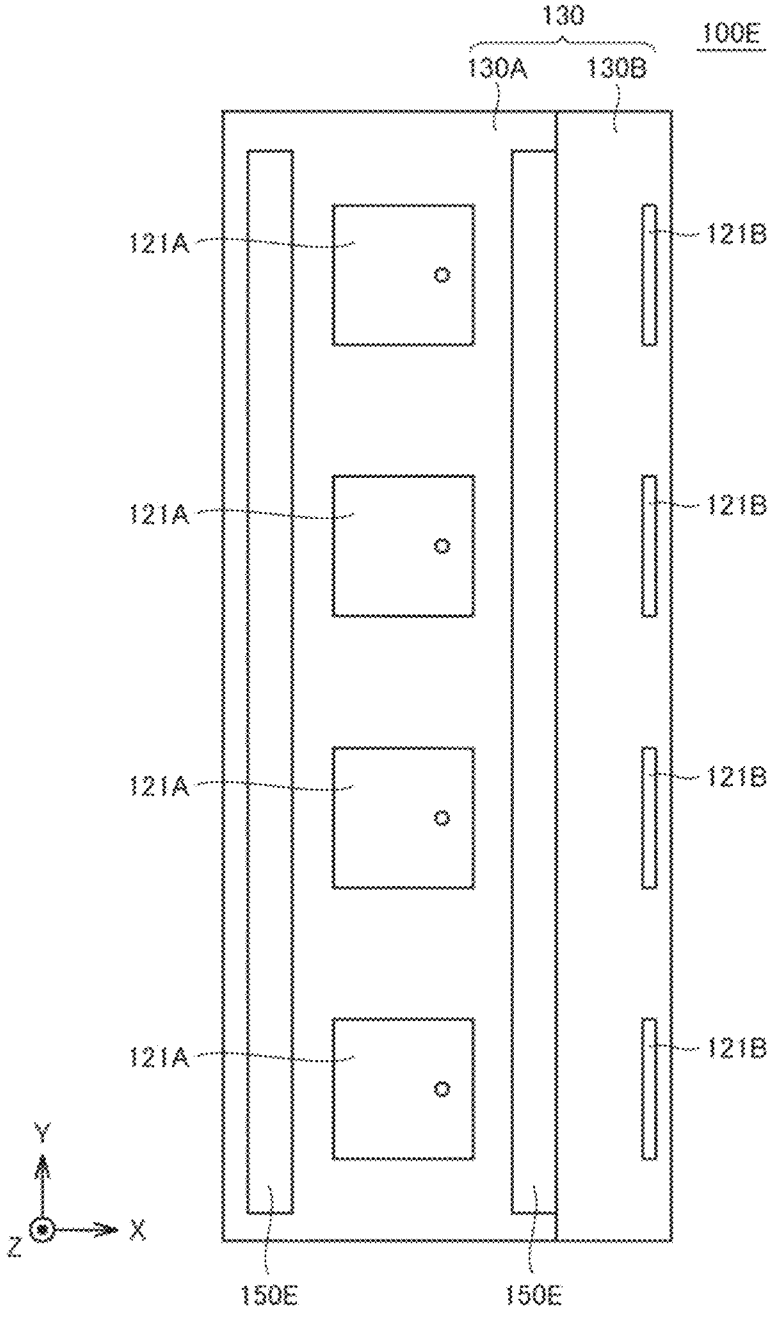
FIG. 7 is a plan view of an antenna module in Modification 2.

Alternatively, as illustrated for peripheral electrodes 150E of an antenna module 100E in Modification 2 illustrated in FIG. 7, an integration configuration of the peripheral electrodes for the adjacent radiating elements may be used.

In plan view, in the X-axis direction, of each of the antenna module 100D in FIG. 6 and the antenna module 100E in FIG. 7, each radiating element 121B is disposed within a region formed from the ground electrode GND2 disposed on the substrate 130B and the peripheral electrode 150 or the peripheral electrodes 150E disposed therefor, in such a manner as to overlap with these components.

In Embodiment 4 and Modification 2, one of the two adjacent radiating elements 121A corresponds to a first radiating element in the present disclosure, and the other corresponds to a third radiating element in the present disclosure. In addition, in Embodiment 4 and Modification 2, one of the two adjacent radiating element 121B corresponds to a second radiating element in the present disclosure, and the other corresponds to a fourth radiating element in the present disclosure.

Embodiment 5

Each of the embodiments and the modifications above has the configuration in which the one or more peripheral electrodes are disposed for the radiating element 121A. For Embodiment 5, a configuration in which a peripheral electrode is disposed also for the radiating element 121B will be described.

Figure 8:
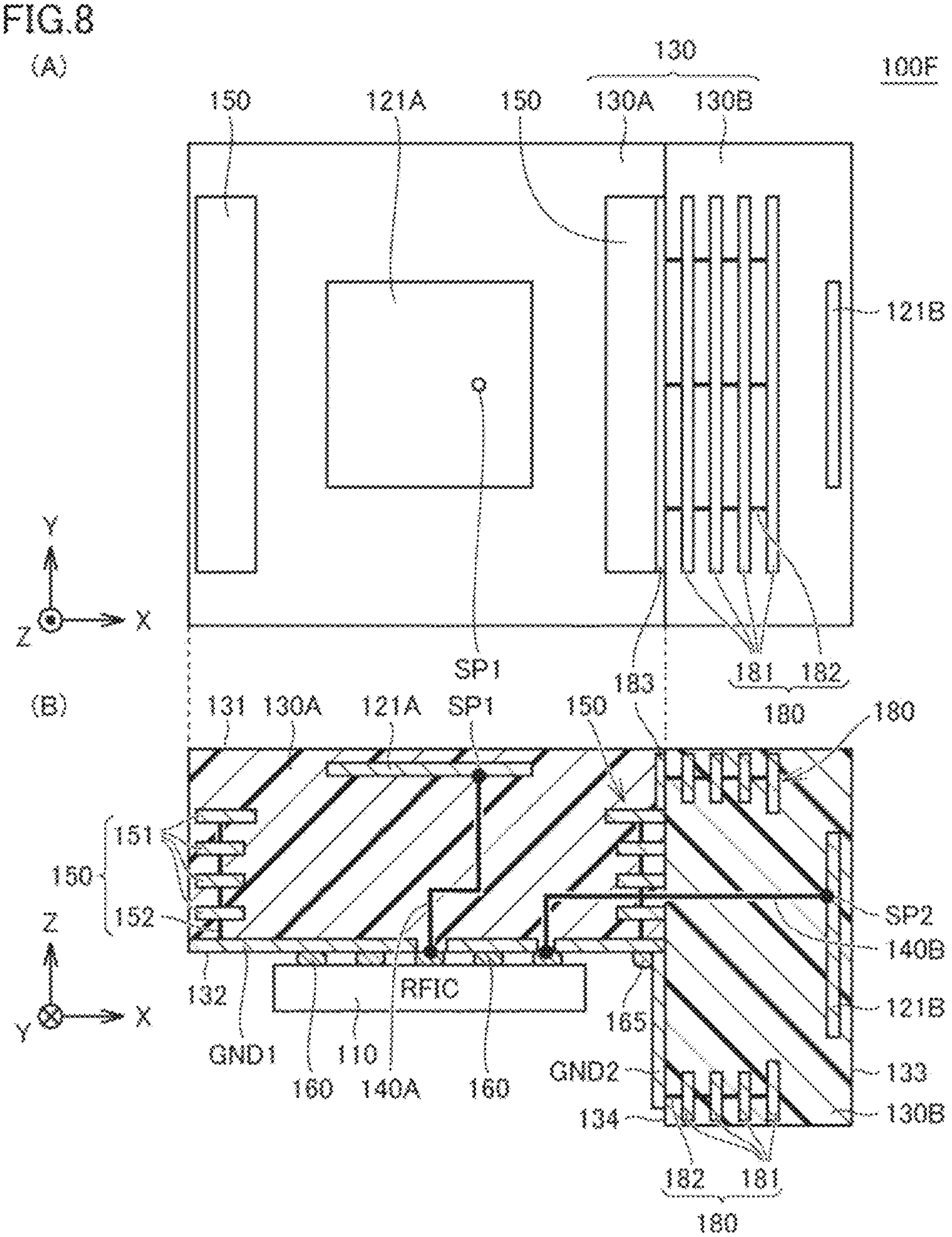
FIG. 8 illustrates a plan view and a side perspective view of an antenna module according to Embodiment 5.

FIG. 8 illustrates a plan view and a side perspective view of an antenna module 100F according to Embodiment 5. The antenna module 100F is different from the antenna module 100 in Embodiment 1 in that peripheral electrodes 180 are disposed in the substrate 130B where the radiating element 121B is disposed. The configuration of the other components FIG. 8 is the same as that of the antenna module 100 illustrated in FIG. 2, and the description of the redundant components is not repeated.

In the antenna module 100F, the peripheral electrodes 180 are disposed on side surfaces of the substrate 130B, in the polarization direction, of a radio wave radiated from the radiating element 121B, that is, near respective end faces in the positive direction and the negative direction of the Z axis in FIG. 8. Like the peripheral electrodes 150 for the radiating element 121A, each of the peripheral electrodes 180 has a plurality of plate electrodes 181 and vias 182 for connecting the plate electrodes 181 and electrically connecting to the ground electrode GND2.

The plurality of plate electrodes 181 are stacked in the X-axis direction in the substrate 130B. Each via 182 extends in the X-axis direction and connects the plate electrodes 181. Further, the via 182 is also connected to the ground electrode GND2. The peripheral electrode 180 disposed on the upper surface side is connected to the peripheral electrode 150 in the substrate 130A by using a plate electrode 183 because the ground electrode GND2 is not located nearby. Although FIG. 8 illustrates the configuration in which each peripheral electrode 180 is provided with the three vias 182, it suffices that at least one via 182 is disposed.

As described above, disposing the peripheral electrodes 180 also in the substrate 130B enables antenna characteristic deterioration in a radio wave radiated from the radiating element 121B to be prevented and also enables the area of the radio wave radiation surface of the substrate 130B to be reduced. Accordingly, a dimension, in the Z-axis direction, of the substrate 130B may be reduced, and further downsizing and height reduction of the antenna module may be achieved.

In more preferable layout, part of the peripheral electrode 180 on the upper surface side overlaps with the radiating element 121A in plan view in the X-axis direction. The layout as described above enables the antenna module to be downsized further than in a case where the peripheral electrode 180 does not overlap with the radiating element 121A.

The peripheral electrodes 180 in Embodiment 5 corresponds to a second peripheral electrode in the present disclosure.

Embodiment 6

For Embodiment 6, different connection forms of the two substrates included in the dielectric substrate 130 will be described.

First Example

Figure 9:
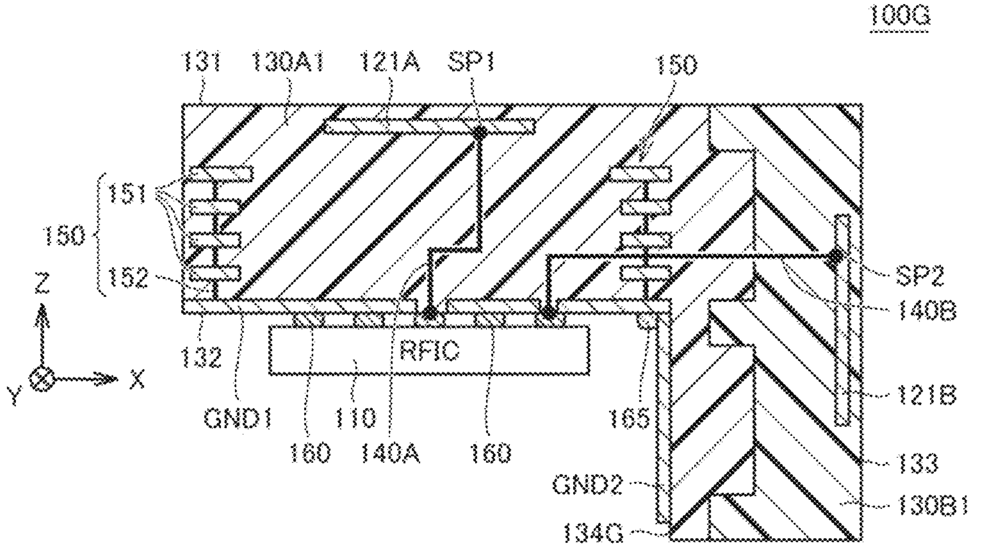
FIG. 9 is a side perspective view of an antenna module according to a first example of Embodiment 6.

FIG. 9 is a side perspective view of an antenna module 100G according to a first example of Embodiment 6. The dielectric substrate 130 in the antenna module 100G includes a substrate 130A1 and a substrate 130B1.

The antenna module 100 in Embodiment 1 has the configuration in which both of the substrates 130A and 130B are shaped into substantially a rectangular parallelepiped plate and a flat main surface of the substrate 130B is connected to a flat side surface of the substrate 130A. In contrast, in the antenna module 100G, protrusions and recesses are formed on the surface of connection between the substrate 130A1 and the substrate 130B1, and connection therebetween is made in such a manner that the protruding portions of one of the substrates are fitted in the recessed portions of the other.

Specifically, the substrate 130A1 where the radiating element 121A is disposed is a substantially L-shaped dielectric block in plan view in the Y-axis direction, and the protrusions and recesses are formed on the side surface in the positive direction of the X axis. The substrate 130B1 where the radiating element 121B is disposed is a substantially E-shaped dielectric block in plan view in the Y-axis direction. The main surface 133, in the positive direction of the X axis, of the substrate 130B1 is flat, while the protrusions and recesses are formed on the surface in the negative direction of the X axis.

Each peripheral electrode 150 is disposed in the substrate 130A1. The ground electrode GND2 for the radiating element 121B is disposed on a side surface 134G, in the negative direction of the X axis, of a protruding portion extending from a main surface 132 of the substrate 130A1 in the negative direction of the Z axis.

The configuration of the other components except the above is the same as the configuration of those of the antenna module 100 in Embodiment 1.

As described above, in the antenna module 100G, forming the protruding and recessed portions fitted in each other on the connection portion between the two substrates enables bonding between substrates to be made stronger. Further, disposing the peripheral electrodes like Embodiment 1 enables the antenna characteristic deterioration to be prevented and downsizing to be achieved.

Second Example

Figure 10:
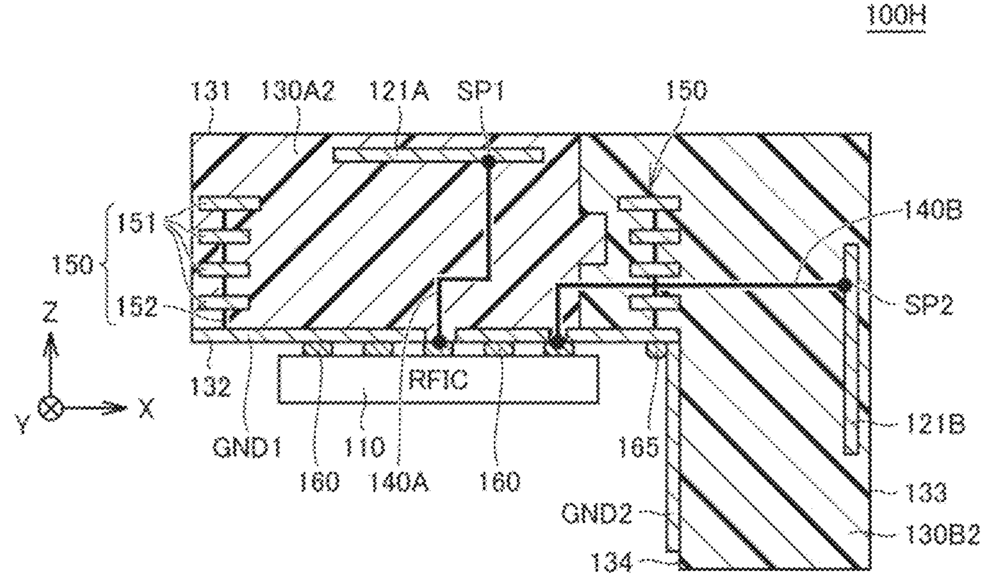
FIG. 10 is a side perspective view of an antenna module according to a second example of Embodiment 6.

FIG. 10 is a side perspective view of an antenna module 100H according to the second example of Embodiment 6. The dielectric substrate 130 in the antenna module 100H includes a substrate 130A2 and a substrate 130B2, and protrusions and recesses are formed on the surface of connection between the substrate 130A2 and the substrate 130B2.

The substrate 130A2 where the radiating element 121A is disposed is a substantially plate-shaped dielectric block in plan view in the Y-axis direction, and the protrusions and recesses are formed on the side surface in the positive direction of the X axis. The substrate 130B2 where the radiating element 121B is disposed a substantially L-shaped dielectric block in plan view in the Y-axis direction, and the protrusions and recesses are formed on the surface, in the negative direction of the X axis, of protruding portions extending from the main surface 134 of the substrate 130B2 in the negative direction of the X axis.

One of the peripheral electrodes 150 is disposed in the protruding portions described above of the substrate 130B2. Part of the ground electrode GND1 for the radiating element 121A is disposed on the lower surface side of the protruding portions of the substrate 130B2.

Forming the protruding and recessed portions fitted in each other also in the antenna module 100H in the second example on the connection portion between the two substrates enables bonding between substrates to be made stronger. Further, disposing the peripheral electrodes like Embodiment 1 enables the antenna characteristic deterioration to be prevented and downsizing to be achieved.

The embodiments disclosed this time are to be construed as being illustrative and not restrictive in all respects. It is intended that the scope of the present disclosure is defined by the scope of claims, not by the description of the embodiments above, and include the meaning equivalent to the scope of claims and any change made within the scope.

REFERENCE SIGNS LIST

10 communication apparatus
100, 100A to 100H antenna module
110 RFIC
111A to 111H, 113A to 113H, 117A, 117B switch
112AR to 112HR low-noise amplifier
112AT to 112HT power amplifier
114A to 114H attenuator
115A to 115H phase shifter
116A, 116B signal multiplexer/demultiplexer
118A, 118B mixer
119A, 119B amplifier circuit
120 antenna device
121A, 121B radiating element
130, 130C dielectric substrate
130A, 130A1, 130A2, 130B, 130B1, 130B2 substrate
131, 131C upper surface
132, 132C, 135C lower surface
133, 134 main surface
133C, 134C, 134G side surface
140A, 140B feed wiring line
150, 150A, 150B, 150E, 180 peripheral electrode
151, 181, 183 plate electrode
152, 182 via
160 solder bump
165 connecting member
200 BBIC
GND1, GND2 ground electrode
SP1, SP2 feed point

The invention claimed is:

1. An antenna module comprising:

a dielectric substrate;

a first radiating element and a second radiating element that are of a plate shape and disposed in or on the dielectric substrate;

a first ground electrode included in the dielectric substrate and disposed to face the first radiating element;

a second ground electrode included in the dielectric substrate, the second ground electrode being disposed to face the second radiating element and being electrically connected to the first ground electrode; and a first peripheral electrode disposed in a layer in the dielectric substrate and electrically connected to the first ground electrode, the layer being between the first ground electrode and the first radiating element, wherein a direction normal to the first radiating element is a first direction from the first ground electrode toward the first radiating element, wherein a direction normal to the second radiating element is a second direction different from the first direction, wherein the first peripheral electrode extends from the first ground electrode in the first direction, wherein in plan view in the second direction, the second radiating element is disposed within a region formed by the first peripheral electrode and the second ground electrode, and wherein a distance between the second radiating element and the first peripheral electrode in the second direction is longer than a distance between the first radiating element and the first peripheral electrode in the second direction.

2. The antenna module according to claim 1, wherein a distance between the second radiating element and an end portion on a first radiating element side of the first peripheral electrode in the first direction is longer than a distance between the first radiating element and the first peripheral electrode in the first direction.

3. The antenna module according to claim 2, wherein the dielectric substrate includes a first substrate where the first radiating element and the first ground electrode are disposed and a second substrate where the second radiating element and the second ground electrode are disposed.

4. The antenna module according to claim 3, wherein in or on the second substrate, the first peripheral electrode and the second ground electrode are disposed at positions equidistant from the second radiating element in the second direction.

5. The antenna module according to claim 3, wherein the first peripheral electrode is disposed in the first substrate, and wherein the first peripheral electrode includes a plurality of plate electrodes stacked in the first direction and at least one via for connecting the plurality of plate electrodes to the first ground electrode.

6. The antenna module according to claim 3, further comprising:

a second peripheral electrode included in the second substrate, the second peripheral electrode being disposed in a layer between the second ground electrode and the second radiating element and electrically connected to the second ground electrode, wherein the second peripheral electrode extends in the second direction from a position at which the second ground electrode is disposed in or on the second substrate.

7. The antenna module according to claim 6, wherein in the plan view in the second direction, the first radiating element overlaps with part of the second peripheral electrode.

8. The antenna module according to claim 7, wherein the part of the second peripheral electrode is connected to the first peripheral electrode.

9. The antenna module according to claim 8, wherein the second peripheral electrode includes a plurality of plate electrodes stacked in the second direction and at least one via for connecting the plurality of plate electrodes to each other.

10. The antenna module according to claim 9, wherein in the plan view in the second direction, at least part of the second radiating element overlaps with the first peripheral electrode.

11. The antenna module according to claim 10, wherein the first radiating element is rectangular in plan view in the first direction, wherein the first peripheral electrode extends along a first side of the first radiating element, and wherein a length along the first side of the first peripheral electrode is longer than a length of the first side of the first radiating element.

12. The antenna module according to claim 10, wherein the first peripheral electrode extends in a direction crossing polarization of a radio wave radiated from the first radiating element, and wherein the length of the first peripheral electrode in the direction in which the first peripheral electrode extends is longer than an outer diameter dimension of the first radiating element.

13. The antenna module according to claim 12, wherein in the plan view in the first direction, the first peripheral electrode is disposed between the first radiating element and the second radiating element.

14. The antenna module according to claim 1, comprising:

a third radiating element of a plate shape included in the dielectric substrate, the third radiating element being adjacent to the first radiating element in a third direction and being disposed to face the first ground electrode;

a fourth radiating element of a plate shape included in the dielectric substrate, the fourth radiating element being adjacent to the second radiating element in the third direction and being disposed to face the second ground electrode; and a second peripheral electrode disposed in a layer in the dielectric substrate and electrically connected to the first ground electrode, the layer being between the first ground electrode and the third radiating element, wherein the second peripheral electrode is disposed at a position in the first direction from the first ground electrode, wherein in the plan view in the second direction, the fourth radiating element is disposed within a region formed by the second peripheral electrode and the second ground electrode, and wherein a distance between the fourth radiating element and the second peripheral electrode in the second direction is longer than a distance between the third radiating element and the second peripheral electrode in the second direction.

15. The antenna module according to claim 1, comprising:

a third radiating element of a plate shape included in the dielectric substrate, the third radiating element being adjacent to the first radiating element in a third direction and being disposed to face the first ground electrode; and a fourth radiating element of a plate shape included in the dielectric substrate, the fourth radiating element being adjacent to the second radiating element in the third direction and being disposed to face the second ground electrode, wherein in the plan view in the second direction, the fourth radiating element is disposed within a region formed by the first peripheral electrode and the second ground electrode, and wherein a distance between the fourth radiating element and the first peripheral electrode in the second direction is longer than a distance between the third radiating element and the first peripheral electrode in the second direction.

16. The antenna module according to claim 1, further comprising:

a feeder circuit configured to supply a radio frequency signal to the radiating elements.

17. A communication apparatus comprising:

the antenna module according to claim 16.

18. An antenna module comprising:

a dielectric substrate;

a first radiating element and a second radiating element that are of a plate shape and disposed in or on the dielectric substrate;

a first ground electrode included in the dielectric substrate and disposed to face the first radiating element;

a second ground electrode included in the dielectric substrate, the second ground electrode being disposed to face the second radiating element and being electrically connected to the first ground electrode; and a first peripheral electrode disposed in a layer in the dielectric substrate and electrically connected to the first ground electrode, the layer being between the first ground electrode and the first radiating element, wherein a direction normal to the first radiating element is a first direction from the first ground electrode toward the first radiating element, wherein a direction normal to the second radiating element is a second direction different from the first direction, wherein the first peripheral electrode extends from the first ground electrode in the first direction, wherein the first peripheral electrode also functions as a ground electrode of the second radiating element, and wherein a distance between the second radiating element and the first peripheral electrode in the second direction is longer than a distance between the first radiating element and the first peripheral electrode in the second direction.

19. The antenna module according to claim 18, further comprising:

a feeder circuit configured to supply a radio frequency signal to the radiating elements.

20. A communication apparatus comprising:

The antenna module according to claim 19.

* * * * *